April 29, 1969   A. E. TAYLOR ET AL   3,441,106

AXLE MECHANISM

Filed Oct. 1, 1965   Sheet 1 of 3

INVENTORS
ALBERT E. TAYLOR
IVAN E. BENJAMIN
BY Hoffmann and Yount
ATTORNEYS

INVENTORS
ALBERT E. TAYLOR
IVAN E. BENJAMIN

BY *Hoffmann and Yount*

ATTORNEYS

United States Patent Office 3,441,106
Patented Apr. 29, 1969

3,441,106
AXLE MECHANISM
Albert E. Taylor, Mentor, and Ivan E. Benjamin, Wickliffe, Ohio, assignors to Eaton Manufacturing Company, Cleveland, Ohio, a corporation of Ohio
Filed Oct. 1, 1965, Ser. No. 492,027
Int. Cl. F01m 1/10; F16n 17/06, 13/22
U.S. Cl. 184—6
11 Claims

ABSTRACT OF THE DISCLOSURE

A tendem axle mechanism comprises an interaxle differential drivingly connected between driving axles. A gear train is connected with the interaxle differential to deliver torque to one of the driving axles. A housing contains the gear train and the interaxle differential and has a lubricant-receiving channel above the gear train and interaxle differential. Lubricant is delivered into the channel by the gear train and the interaxle differential. The channel has a lubricant passage means for directing lubricant from the channel to the interaxle differential. Lubricant is delivered to the gear train at least in part by a lubricant pickup surface on the differential carrier for one of the axles. A lubricant director member cooperates with the pickup surface on the differential carrier and receives lubricant therefrom. The director member is a plate-like member which has at least an edge portion made of a plastic-like material.

---

The present invention relates to an axle mechanism and more particularly to a tandem axle mechanism including a pair of axles having an interaxle differential connected between the axles.

An important object of the present invention is the provision of a new and improved axle mechanism having a simplified lubrication system for delivering lubricant to different parts of the axle and which is constructed and arranged to provide a substantial flow of lubricant to the different parts thereof at extremely low rotational speeds.

Another object of the present invention is the provision of a new and improved axle mechanism having a lubrication system including a member having a lubricant pickup surface rotatable in a lubricant reservoir and a non-abrasive lubricant director in contact with the lubricant pickup surface to remove lubricant from the pickup surface without abrading the pickup surface and for directing the lubricant from the pickup surface for delivery to other parts of the axle.

Another object of the present invention is the provision of a new and improved axle mechanism having a lubrication system including a member having a lubricant pickup surface rotatable in a lubricant reservoir and which transports lubricant to a lubricant director having at least an edge portion made of a plastic-like material located adjacent the lubricant pickup surface for removing lubricant from the pickup surface and a lubricant flow directing surface connected with the edge portion for directing lubricant removed from the pickup surface for delivery to different parts of the axle.

Another object of the present invention is the provision of a new and improved tandem axle mechanism including a pair of axles interconnected by an interaxle differential unit and wherein the interaxle differential unit is contained within a housing also containing a differential unit for one of the axles, with one of the drive members of the differential unit having a lubricant pickup surface rotatable in an oil reservoir, and with a lubricant director located adjacent the pickup surface for removing lubricant from the pickup surface and for directing lubricant toward a gear train which constitutes the input for the differential unit and which in turn conveys lubricant to a channel in the housing and lubricant in the channel is directed to the interaxle differential and the channel extends above the interaxle differential and receives lubricant from the interaxle differential whereby lubrication of the interaxle differential occurs at low axle speeds.

A further object of the present invention is the provision of a new and improved tandem axle mechanism having an axle housing containing an interaxle differential connected between a pair of driving axles and wherein the interaxle differential is lubricated at least in part by lubricant delivered into a channel in the axle housing located above the interaxle differential and wherein lubricant is delivered by the interaxle differential to the channel through a slot in the housing located above the interaxle differential and communicating with the channel.

Still a further object of the present invention is the provision of a new and improved axle mechanism having a housing defining a gear chamber and supporting a differential mechanism therein and having a power input shaft and a pair of power output shafts supported by bearings which in turn are supported in spaced portions of the housing and wherein the housing has a smooth conical outer wall portion defining part of the chamber and located between the output shaft bearings and the bearings supporting the input shaft such that the housing is readily capable of withstanding the forces subjected thereto and yet is light in weight and simple in construction.

Still a further object of the present invention is the provision of an improved housing for an axle mechanism, as noted in the next preceding paragraph, wherein the housing includes bearing support structure for input and outputs shafts in a unitary body which bearing support structures are separated from each other by a generally frusto-conical wall portion having a relatively large slant height so that flexure of the housing member due to relative movement between the input and output shafts is extremely slight.

Other objects and advantages of the present invention will become apparent from the following detailed description of a preferred embodiment thereof made with reference to the accompanying drawings forming a part of this specification and in which.

The present invention provides an improved axle mechanism and in particular provides an improved tandem axle mechanism including a pair of driving axles having an interaxle differential connected therebetween. Certain features of the present invention are usable in single axle arrangements and other drive mechanisms, as well as tandem axle mechanisms. One feature, for example, is directed to the lubrication of certain of the parts of an axle mechanism, and certain features of the lubricating system may be used in axle mechanisms and drive arrangements other than a tanden axle.

Figure 6:
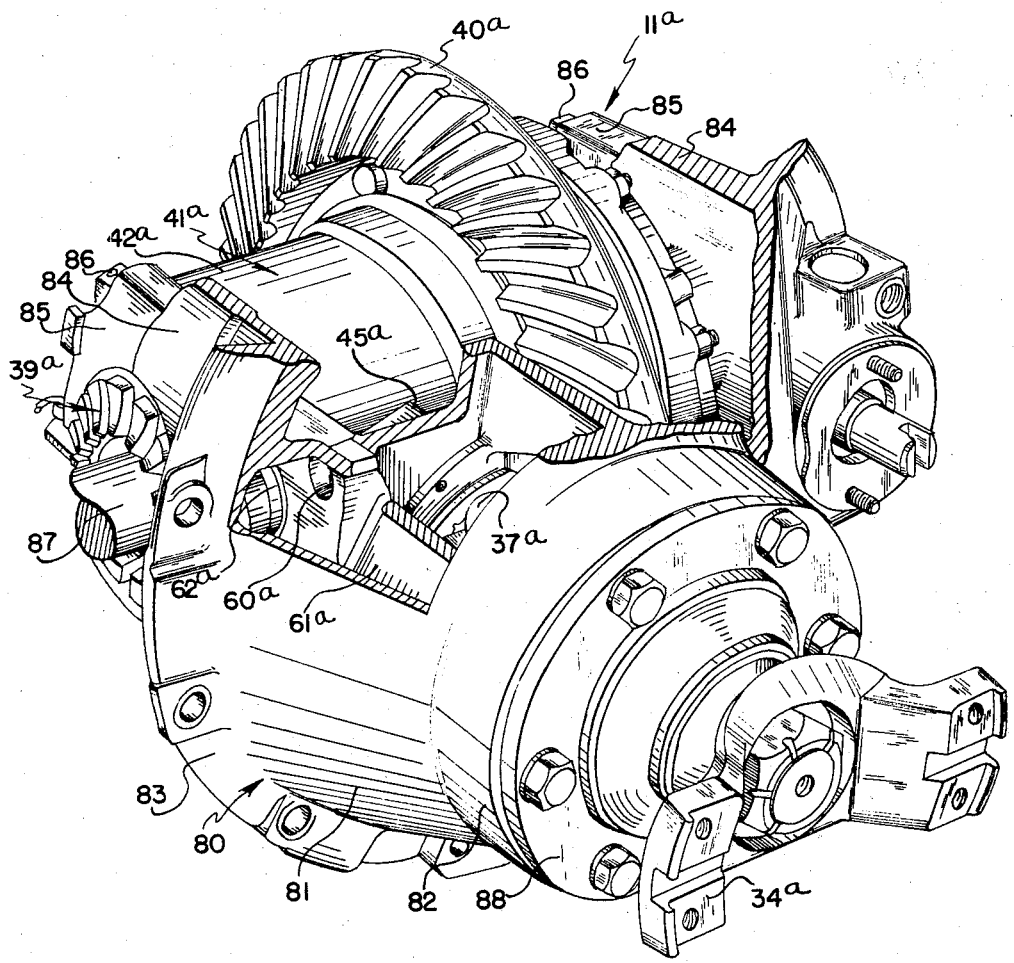
FIG. 6 is a perspective view of a portion of an axle mechanism embodying the present invention.

As representing a preferred embodiment of the present invention, the drawings illustrate a tandem axle mechanism 10. The tandem axle mechanism 10 includes an input shaft 13 for delivering torque to an interaxle differential mechanism 12 supported in a housing 9 and which in turn drives a forward axle 11 and a rear axle 11a, shown in FIG. 6. The interaxle differential 12 which is driven upon rotation of the input shaft 13, includes a planet pinion carrier 14 carried by shaft 13, and pinion gears 16 carried by the carrier 14 and which mesh with side gears 17 and 18. Side gear 17 is fixed on a shaft 23 to drive shaft 23 upon rotation thereof and is supported in a bearing 31. The shaft 23 has a stepped bore in the end thereof generally indicated 32 and which surrounds the end of input shaft 13 forming a support therefor. Shaft 23 extends from the housing 9 to the rear axle mechanism 11a and is drivingly connected thereto.

Upon rotation of input shaft 13, the interaxle differential 12 transmits torque to the rear axle 11a through shaft 23 and to a gear 25 formed integral with side gear 18 and which is mounted on shaft 13 for rotation with respect thereto. The gear 25 meshes with a gear 33 mounted on a shaft 34. Shaft 34 is mounted for rotation in the housing 9 by means of thrust bearings 35 and 36 and carries a beveled pinion gear 37 at one end thereof for transmitting torque to the forward axle 11. The pinion gear 37 meshes with a ring gear 40 of a differential unit 39 for transmitting torque to a pair of output shafts 43 which when rotated drive traction wheels for powering the vehicle in which the axle mechanism is incorporated. The ring gear 40 is connected with a differential case or carrier 41 mounted in the housing 9 for rotation with the ring gear 40. The carrier 41 is a hollow cylindrical body forming a part of the differential unit 39.

The forward axle 11 includes means providing for lubrication of parts of the drive thereof including the interaxle differential 12, and the lower part 9a of housing 9 forms a lubricant reservoir containing lubricant 44 for delivery to the parts to be lubricated. The differential support case or carrier 41 has a cylindrical outer lubricant pickup surface 42 which is partially immersed in the lubricant in the reservoir and rotates therein and which is operative to pick up lubricant from the reservoir and carry the lubricant on the surface 42 as it is rotated. Lubricant carried by surface 42 is removed therefrom by a lubricant director 45 from which the lubricant is directed to different parts of the axle mechanism as will be described hereinbelow.

Figure 2:
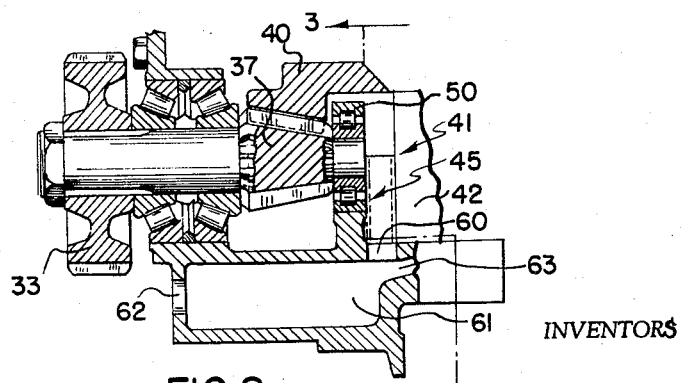
FIG. 2 is a sectional view of the axle mechanism of FIG. 1 taken approximately along section line 2—2 of FIG. 1.
Figure 3:
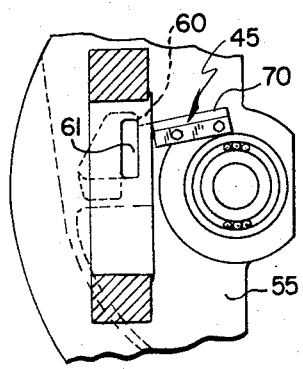
FIG. 3 is a sectional view of the axle mechanism of FIG. 2 taken approximately along section line 3—3 of FIG. 2.
Figure 4:
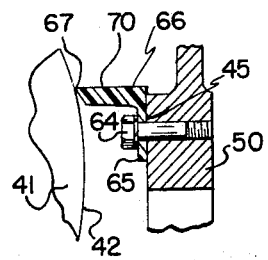
FIG. 4 is an enlarged sectional view of a portion of the axle mechanism of FIG. 1.
Figure 5:
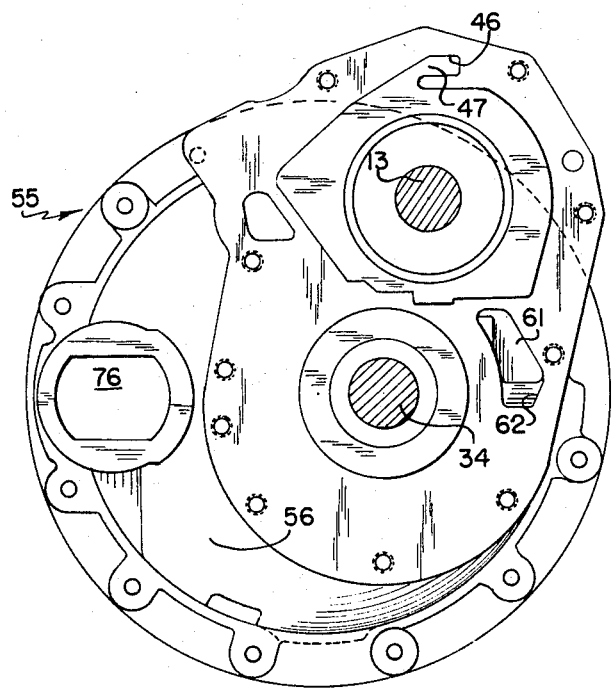
FIG. 5 is a vertical sectional view of a portion of the axle mechanism of FIG. 1 taken approximately along the section line 5—5 thereof.

As shown in FIG. 2, the lubricant director 45 lies closely adjacent the cylindrical lubricant pickup surface 42 of the differential support case or carrier 41 and extends axially therealong. The lubricant director 45 is mounted upon an interior wall 50 of housing 9 by a conventional fastener 64. The lubricant director 45 includes a mounting flange 65 and a lubricant directing portion 66 with the fastener 64 extending through the flange 65. A lubricant receiving port 60 leading to a chamber 61 is located immediately adjacent an end of the lubricant director. The lubricant director 45 also includes an edge portion 67 for removing lubricant from surface 42 of differential carrier 41 and a lubricant flow directing surface 70 for receiving lubricant so removed from the surface 42 and for directing the lubricant into the aforementioned chamber 61. The lubricant director is positioned such that the top surface 70 of the director lies at a slight angle to the axis of rotation of the differential carrier 41. As shown in FIG. 3, this surface slopes slightly toward the port 60. It has been found that flow of lubricant to the chamber 61 increases as a result of mounting the fluid director at an angle with respect to the axis of rotation of the differential carrier and this angle is preferably approximately 10 degrees.

The lubricant director 45 is constructed of a plastic-like material. The use of a plastic-like material for removing lubricant from the pickup surface 42 insures that the character of the pickup surface 42 will not be altered due to abrasion and wear as a result of contact with the lubricant director 45. Moreover, due to the relatively low coefficient of friction of plastic-like materials, wearing away of the lubricant director is reduced, thus eliminating the need for wear compensating mechanisms associated therewith. The material of the lubricant director may be any plastic-like, non-abrasive material as, for example, neoprene, nylon or rubber. However, care should be exercised in choosing a lubricant director material which is chemically compatible with the lubricant to be used.

As noted above, lubricant removed from surface 42 flows through port 60 into chamber 61 which forms a receiver for lubricant directed thereto by the lubricant director 45 and includes ports 62 and 63 through which lubricant is channeled to various portions of the axle mechanism. Port 63 is operative to direct lubricant into the interior of carrier 41 to provide lubrication for the axle differential 39 and to planetary gearing for multiple speed axles, where such an axle mechanism is used, and to the axle support bearings. Port 62 directs lubricant into the lower portion of the gear chamber defined by the housing 9 and to the gear 33 forming a part of the gear train drivingly connecting the interaxle differential 12 with the differential unit 39. The lubricant is carried by gear 33 to gear 25 from which a portion of the lubricant is transmitted to and utlimately slung into a channel 46, located above and extending directly over the gear 25 and interaxle differential 12, and formed in the upper portion of the housing 9. Gear 25 additionally directs a portion of the lubricant received from gear 33 to the interaxle differential which also slings the lubricant into the channel 46.

The channel 46 has a slot 47 therein which extends coaxially with the channel 46 over the gear 25 and interaxle differential 12. The lubricant slung into channel 46 by gear 25 and the interaxle differential flows through a passage 50 and into a channel 51 in the shaft 23. Lubricant flows from channel 23 into the bore 32 of shaft 23. The bore 32 communicates with central bore 24 of input shaft 13. The bore 24 has passages 53 extending radially therefrom and which direct lubricant from the bore to the interaxle differential 12. At least a portion of the lubricant is again slung onto the channel 46 by the differential.

It should be apparent from the above, that a portion of the lubricant in channel 46 is directed thereto by the interaxle differential and the substantial remainder of the lubricant in channel 46 is directed thereto by the gear 25, and that by providing slot 47 in the channel such that both the gear 25 and the interaxle differential 12 direct lubricant into the channel therethrough, a substantial flow of lubricant in the channel is obtained at relatively low axle speeds. It has been found that this construction provides for lubrication of the interaxle differential 12 at extremely low rotational speed of the axle mechanism, thereby reducing wear and insuring a long life for the interaxle differential 12.

From the above description, it should be apparent that the housing 9 includes lubricant passages forming part of the lubrication system for the forward axle 11. The housing 9, of course, must also be of sufficient strength as to be capable of withstanding forces applied thereto during the operation of the vehicle in which it is incorporated. The housing 9 is so constructed, and includes two housing members 54 and 55, joined together in a conventional manner. Housing members 54 and 55 form the gear chamber in which the interaxle differential 12 and a portion of the forward axle mechanism 11 are located. Housing member 55 is connected by suitable means to another housing member generally indicated at 57 which covers the forward axle differential 39 and forms a part of the lubricant reservoir. The lower portion of housing elements 55 and 57 form the lubricant reservoir from which lubricant is transmitted by the differential carrier 41 and the lubricant director 45 and ultimately into the gear chamber, as described above.

Housing 55 includes a conical wall portion 56, see FIG.

Figure 1:
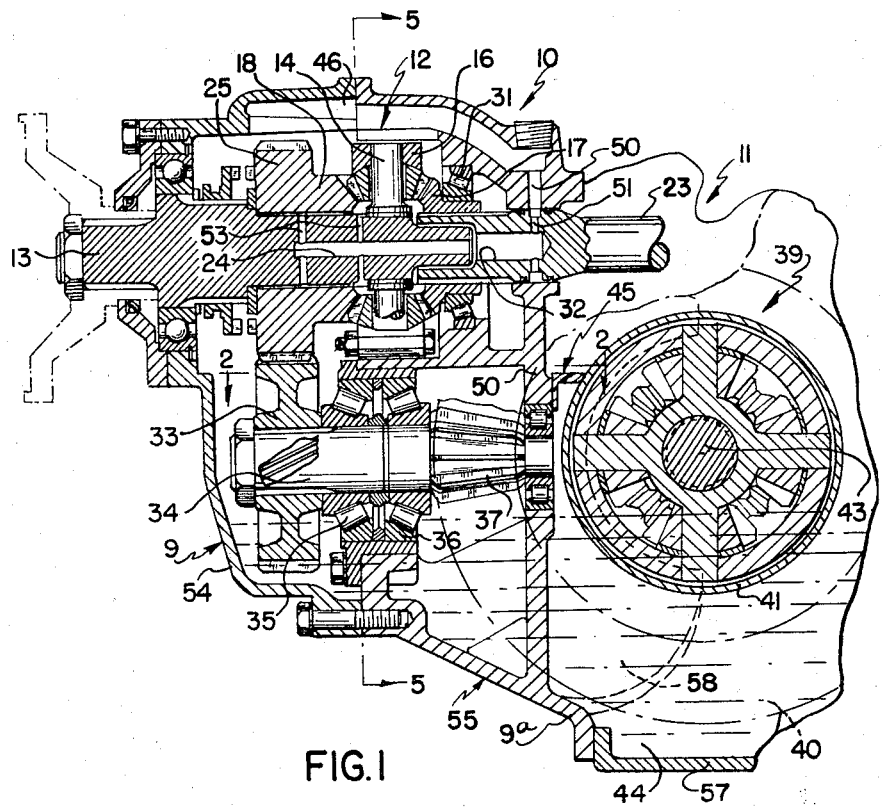
FIG. 1 is a sectional view of an axle mechanism embodying the present invention.

5, extending a substantial distance around the housing and axially extending bearing support portions 58, see FIG. 1, projecting therefrom for supporting bearings for the forward axle shafts 43. The bearing support portions terminate in the conical wall portion 56 so that axial forces exerted upon the bearing support portions 58 by the shafts 43 are transmitted directly into the conical wall portion 56 in such a manner that bending of the housing 55 is minimized. The angle which the conical wall portion 56 makes with the axis of input shaft 13 is preferably between 2 degrees and 47 degrees. The bearing support portions are similar to bearing support portions forming a part of the housing of the rear axle 11a and will be described in greater detail in connection therewith. A shift mechanism for changing the axle drive ratio of the axle mechanism is mounted on the housing 9 and opening 76 is provided therefor, but this mechanism is not of interest here.

The rear axle mechanism illustrated in FIG. 7, includes a number of features which are usable in single axle mechanisms as well as other drive mechanisms and which are common to both the front and rear axle mechanisms illustrated herein. Many of these features are also applicable to single axle arrangements. Corresponding features of the axle mechanisms are referred to by the same reference numerals, rear axle numerals being distinguished by a subscript a. The rear axle mechanism 11a includes a housing 80 supporting bearings for an input shaft 34a driven from shaft 23 which, as described above, is driven by the interaxle differential. The shaft 34a has a beveled pinion gear 37a at one end thereof for transmitting torque to the axle drive mechanism.

The axle drive mechanism includes a ring gear 40a in mesh with pinion gear 37a and having a differential support case or carrier 41a mounted thereon for rotation therewith. The support case or carrier 41a is a hollow cylindrical member containing a differential unit 39a for transmitting torque to the axle shafts 87. The differential carrier includes an outer cylindrical pickup surface 42a rotatable in a lubricant reservoir formed in part by the housing and is operative to transport lubricant from the reservoir to a lubricant director member 45a. Lubricant director 45a is positioned closely adjacent the surface 42a and extends axially therealong for a substantial length of the cylindrical surface. The director removes oil from surface 42a and channels the oil through a port 60a into a chamber 61a formed in the housing. Chamber 61a has a port 62a at one end thereof for directing lubricant to a bearing for axle shaft 87 and to the differential mechanism within differential carrier 41a.

The housing 80 has a flat annular mounting surface at the forward end thereof upon which is mounted a cover plate 88. Adjacent the mounting surface is a generally cylindrical wall 82 which merges into a generally frusto-conical wall 81. Wall 81 extends around the periphery of the housing and diverges toward a mounting flange 83 which is adapted to be secured to a suitable housing member covering the differential 39a and not shown. Housing 80 includes a pair of projecting bearing support portions 84 which are continuous with the frusto-conical wall 81 and support the bearings in which the shafts 87 are mounted. Portions 84 have clamping members 85 secured thereto by means of bolts 86 such that the bearings supporting the axles will be firmly held in the portions 84.

The bearing support portions are generally cylindrical wall members which terminate in the base of frusto-conical wall 81. The merger of the portions 84 and walls 81 and 82 is such that lines of force in the housing 80 resulting from relative movement between the shafts 87 and shaft 34a are in tension or in compression so that bending of the housing structure at the juncture of these walls is substantially reduced. Moreover, the frusto-conical wall 81 has a large slant height to reduce any diaphragming effect of the wall due to axial forces acting at opposite ends thereof. It has been found that the frusto-conical wall 81 exhibits excellent resistance to bending and diaphragming due to axial forces acting thereon when the angle between the axis of shaft 34a and the side of the frusto-conical wall is between 2 degrees and 47 degrees. The provision of such a wall portion, integral with the housing member and having ends aligned with bearing support portions integrally connected with the housing results in an extremely strong and lightweight housing member.

It is to be understood that other forms, modifications, and adaptations of the invention shown and described herein could be made and it is intended to cover all such forms, modifications, and adaptations falling within the scope of the appended claims.

Having described our invention, we claim:

1. A tandem axle mechanism comprising an interaxle differential connected between driving axles, a gear train connected with the interaxle differential for delivering torque to one of the driving axles and constituting a power input means for said one of said axles, a housing having a gear chamber therein containing said interaxle differential and said gear train, said housing having a lubricant receiving channel therein extending above said gear train and said interaxle differential, means for delivering lubricant to said gear train and said gear train being operable to transport lubricant to the upper portion of said housing adjacent said channel, slot means in said housing communicating said channel with said gear chamber and through which lubricant is delivered into said channel by said gear train and interaxle differential, and lubricant passage means for directing lubricant from said channel to said interaxle differential.

2. An axle mechanism comprising an interaxle differential connected between driving axles, a gear train connected with the interaxle differential for delivering torque to one of the driving axles and constituting a power input means for said other one of said axles, a housing having a chamber for said interaxle differential and said gear train, said housing having a lubricant receiving channel in an upper portion thereof located above said gear train and said interaxle differential, means for delivering lubricant to said gear train and said gear train being operable to transport the lubricant to the upper portion of said housing adjacent said channel, a slot located in said housing above said gear train and said interaxle differential and communicating said channel with said chamber, said gear train and interaxle differential delivering lubricant into said channel through said slot, and lubricant passage means communicating with said channel and interaxle differential to deliver lubricant from said channel to said interaxle differential.

3. An axle mechanism of the type defined by claim 2 wherein said means for delivering lubricant to said gear train comprises an annular lubricant pickup surface rotatable in a lubricant reservoir to transport lubricant from said reservoir, lubricant directing means having an edge portion composed of a plastic-like material located adjacent said pickup surface for removing lubricant from said pickup surface and a lubricant flow directing surface connected with said edge portion for receiving lubricant removed from said pick up surface by said edge surface, and a lubricant distributing chamber in said housing receiving lubricant from said flow directing surface and having an opening therein communicating said lubricant distributing chamber with said gear chamber for providing lubricant flow to said gear train.

4. In an axle mechanism comprising a housing containing a gear chamber and a lubricant reservoir, a pair of shafts extending into said housing and supported for rotation relative thereto, a differential unit for transmitting torque from a power input to said pair of shafts, an annular differential carrier supporting said differential unit and rotatable in said lubricant reservoir, said carrier having an annular lubricant pickup surface thereon for transporting lubricant from said reservoir and which extends axially of said shafts, and lubricant directing means secured to said housing and having an edge portion of plastic-like material located adjacent said pickup surface for removing lubricant from said pickup surface and a lubricant flow directing surface connected with said edge portion for receiving lubricant removed from said pickup surface by said edge surface and directing said lubricant for delivery to different locations in said housing.

5. In an axle mechanism as defined in claim 4 wherein said lubricant directing means comprises a plate-like member extending axially of said carrier and having an upper surface comprising said flow directing surface, and includes a flange portion cooperating with fastening means securing said plate member to said housing.

6. In an axle mechanism comprising a housing containing a gear chamber and a lubricant reservoir, a pair of shafts extending into said housing and supported for rotation relative thereto, a differential gear unit for transmitting torque from a power input to said pair of shafts, an annular differential carrier supporting said differential unit and rotatable in said lubricant reservoir, said carrier having an annular lubricant pickup surface thereon for transmitting lubricant from said reservoir and which extends axially of said shafts, a lubricant directing plate member secured to said housing and having an upper surface and an edge portion extending axially along the lubricant pickup surface for removing lubricant from said pickup surface and directing the lubricant to said upper surface for delivery to different locations in said housing.

7. An axle mechanism comprising a housing containing a gear chamber said housing including a generally annular bearing support portion having bearing supports therein, said bearing support portion terminating in a generally frusto-conical wall portion having substantially straight sides, said wall portion converging in a generally annular end portion, a gear unit in said gear chamber including a differential mechanism having a power input shaft and a pair of power output shafts extending transversely to said power input shaft, said power input shaft mounted in a bearing supported by said annular end portion for rotation with respect thereto, said output shafts mounted in bearings in said bearing support portion for rotation with respect thereto, said bearing support portion, frusto-conical wall portion and end portion integral and substantially coaxial with each other so that bending of the housing in response to relative movement between the shaft members is minimized.

8. The axle mechanism of claim 7 wherein said frusto-conical wall portion extends at an angle of from 2 to 47 degrees with respect to the axis of said input shaft.

9. The axle mechanism of claim 7 wherein said housing includes lubricant directing channels therein for supplying lubricant to different locations in said housing and means for supplying lubricant to said channels.

10. The axle mechanism defined by claim 9 wherein said means for supplying lubricant comprises a member having an annular axially extending lubricant pickup surface rotatable in a supply of lubricant in said gear chamber to transport lubricant therefrom, and lubricant directing means having an axially extending edge portion composed of plastic-like material contacting said pickup surface along a substantial axial length thereof for removing lubricant from said pickup surface and a lubricant flow directing surface connected with said edge portion for receiving lubricant removed from said pickup surface by said edge portion and directing the lubricant for delivery to said channels.

11. An axle mechanism comprising a housing containing a gear chamber and a lubricant reservoir, a gear unit for transmitting torque from a power input to an output and having an annular lubricant pickup surface rotatable in said lubricant reservoir to transport lubricant from said reservoir, lubricant directing means having at least an edge portion composed of a non-abrasive plastic-like material having a low coefficient of friction and located adjacent said pickup surface for removing lubricant from said pickup surface, said plastic-like material being chemically compatible with said lubricant, and a lubricant flow directing surface connected with said edge portion for receiving lubricant removed from said pickup surface by said edge portion and directing the lubricant for delivery to different locations in said housing.

References Cited

UNITED STATES PATENTS

| 2,478,180 | 8/1949 | Buckendale | 74—607 |
| 3,318,173 | 5/1967 | Puidokas | 74—607 X |

FOREIGN PATENTS

| 618,367 | 12/1926 | France. |
| 874,540 | 3/1953 | Germany. |

HOUSTON S. BELL, Jr., *Primary Examiner.*

U.S. Cl. X.R.

74—607; 184—10, 11, 13